United States Patent Office 3,537,767
Patented Nov. 3, 1970

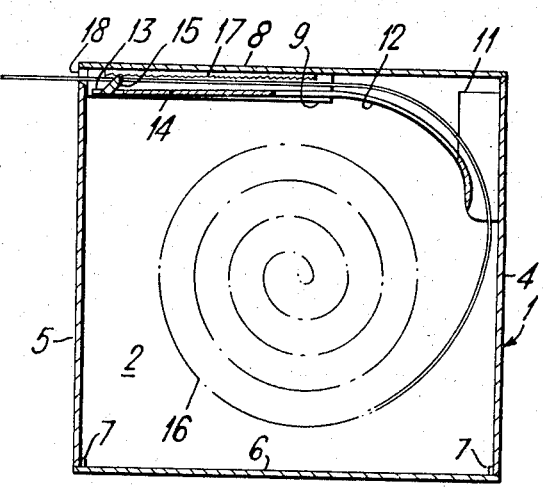
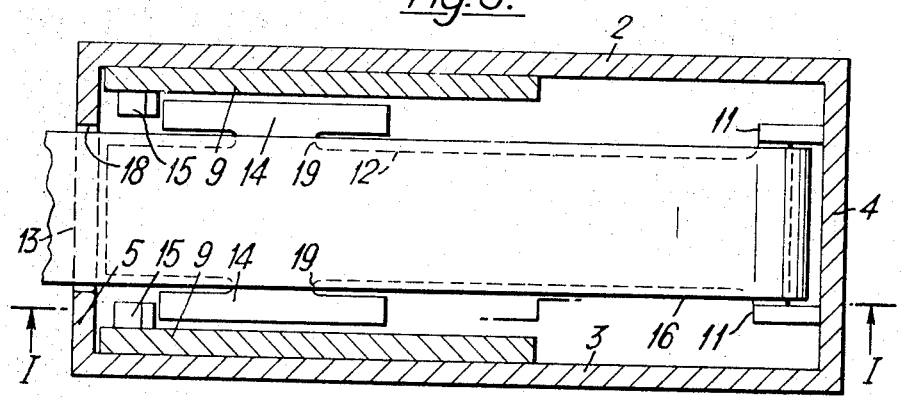
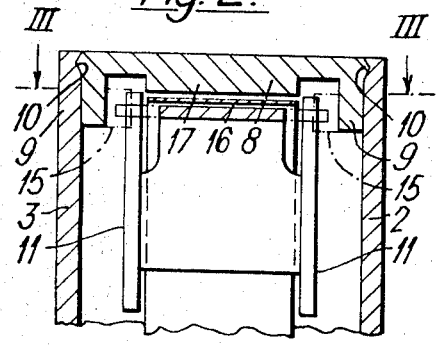
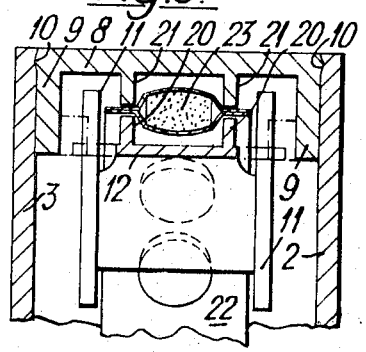

3,537,767
DEVICES INCORPORATING A SPRING OF PLASTICS MATERIAL
Michael James, Welwyn Garden City, England, assignor of one-third each to Trevor Gwilym and Geoffrey Alan Ryder, both of Welwyn Garden City, England
Filed Jan. 17, 1969, Ser. No. 792,119
Claims priority, application Great Britain, Jan. 31, 1968, 4,991/68
Int. Cl. B65h *19/00*
U.S. Cl. 312—39                                    4 Claims

ABSTRACT OF THE DISCLOSURE

A device such as a container for strip material comprises a housing which is integrally moulded out of thermoplastic plastics material and has a sliding cover which can be moved to and from manually. A leaf spring is integrally moulded with the housing and is arranged to press the strip against the cover as this is moved in one direction so that gripping means on the cover grips the strip and dispenses a length of it from the housing. In order to stress the spring to cause it to press the strip against the cover, the cover has a part which moves along the face of the spring remote from the cover as the cover is moved and this part acts on the spring and bends it towards the cover.

---

This invention relates to devices which include a housing carrying a movable operating member and a spring which performs a function as the operating member is moved or after it has been moved. An example of such a device is a dispensing container for dispensing a strip or small articles such as tablets upon movement of a sliding operating member in the form of a cover.

A cheap method of manufacturing such a device is by molding the housing out of thermoplastic plastics material and moulding the spring, in the form of a leaf spring, integrally with the housing.

However, a disadvantage of this arrangement is that the plastics material out of which the spring is made tends to creep under stress and in consequence after a period of time it may cease to operate. Thus, in the case of a dispensing container for tablets or the like, the shelf life is very limited.

According to this invention, a device which comprises a housing with a leaf spring integrally moulded out of thermoplastic plastics material and an operating member movably mounted on the housing, the spring being arranged to perform a function as the operating member is moved or after it has been moved, is provided with a part which is fixed to the operating member and is arranged to act on the spring, the part bending the spring to stress it and make it ready to perform its function as the operating member is moved to carry out its operation.

It will be seen that with this arrangement the spring of plastics material is only stressed when it is actually in use to perform its function and there is therefore no possibility of the stress of the spring being lost owing to creep to cause the spring to become inoperative.

Preferably the operating member is mounted so that it can slide to and fro on the housing and in use it is moved manually. The operating member may then be in the form of a cover which extends over an opening in the housing and on sliding the cover back, to expose the opening, the part which acts on the spring stresses the spring and causes some of the contents, for example a tablet, of a container which is formed by the housing to be ejected from the opening by the spring when the cover is moved sufficiently far back to leave the opening unobstructed. In this case therefore the spring is stressed as the operating member is moved away from a normal rest position and is unstressed again as the cover is moved back.

Alternatively, however, the operating member may be constructed in such a way that it has to be moved to and fro to perform its function. An example of such an arrangement is one in which the housing forms a container for strip material and the operating member is arranged so that on a return movement, after being moved in one direction, it grips the strip and feeds out a length of the strip from the container. In this case the spring is required to press the strip against the operating member on the return stroke of the operating member so that the strip is gripped by the operating member and fed out by it. Under these circumstances the part which acts on the spring is arranged so that on the return movement of the operating member, the part moves along the side of the spring remote from the operating member and presses the spring upwards towards the operating member with the strip sandwiched between the spring and the operating member. At the end of this return movement of the operating member, the part which moves with the operating member slides off the end of the spring and releases it so that the spring adopts its unstressed position spaced from the operating member.

To assist in stressing the spring in a symmetrical manner, there may be two parts fixed to the operating member and these two parts move one along each of two opposite edges of the spring on the side of the spring remote from the operating member when the operating member performs its return movement.

An example, and a modification of this example, of a device constructed in accordance with the invention are illustrated in the accompanying drawings in which:

FIG. 1 is a vertical section of a container and dispenser for tape carrying self-adhesive labels;

FIG. 2 is a section of the container and dispenser to a larger scale and as seen in the direction of the arrows on the line II—II in FIG. 4;

FIG. 3 is a sectional plan of the container and dispenser to the same scale as FIG. 2 and as seen in the direction of the arrows on the line III—III in FIG. 2;

Figure 4:
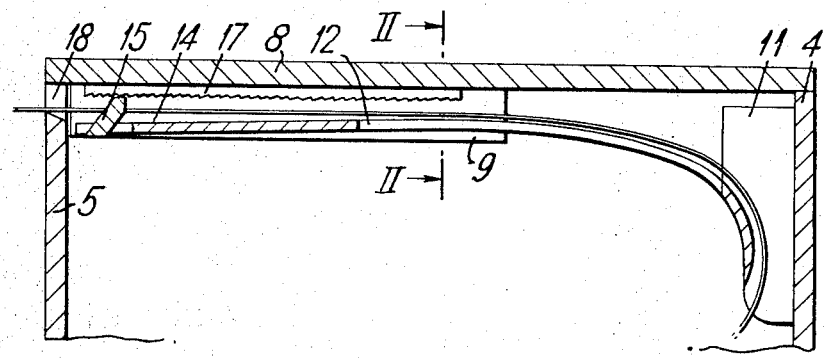

FIGS. 4 to 7 are sections of the upper part of the container and dispenser as seen in the direction of the arrows on the line I—I in FIG. 3 and showing the parts in different stages of operation in the dispensing of a length of the tape; and, FIG. 8 is a section similar to FIG. 2, but showing a modification of the container and dispenser for holding and dispensing a strip-like package of medicinal tablets.

The container and dispenser shown in FIGS. 1 to 7 of the drawings comprises a square housing 1 having side walls 2 and 3 and end walls 4 and 5 all of which are integrally moulded together. In addition there is a bottom 6 which is separately moulded and held in position by lugs 7 and a cover 8 provided with side flanges 9. The cover 8 has projecting edge ribs 10 which fit in corresponding grooves in the side walls 2 and 3 so that the cover 8 can slide to and fro from left to right as seen in FIG. 1.

A pair of projecting ribs 11 are moulded integrally with the end wall 4 and a spring 12 has its righthand end fixed between the ribs 11 and is also moulded integrally with the ribs and the end wall 4.

The spring 12 is in the form of a leaf and extends from the bottoms of the ribs 11 upwards and towards the left as seen in FIG. 1. The spring 12 has a free end 13 and has two platforms 14 projecting from its sides near the free end 13 as best shown in FIG. 3.

A part forming a cam 15 projects inwards from each of the flanges 9 on the cover 8 and when the cover 8 is in its closed position as shown in FIGS. 1, 3 and 4, the cams 15 are just clear of the lefthand ends of the platforms 14.

A roll of carrier tape 16 is held within the housing 1, into which it is inserted by removal of the bottom 6 and the free end of the roll 16 extends upwards between the ribs 11 and over the top of the spring 12 whence it passes under a serrated plate 17 moulded integrally with the cover 8 and thence through a slot 18 formed at the top of the end wall 5 and bounded along its top edge by the cover 8.

Figure 5:
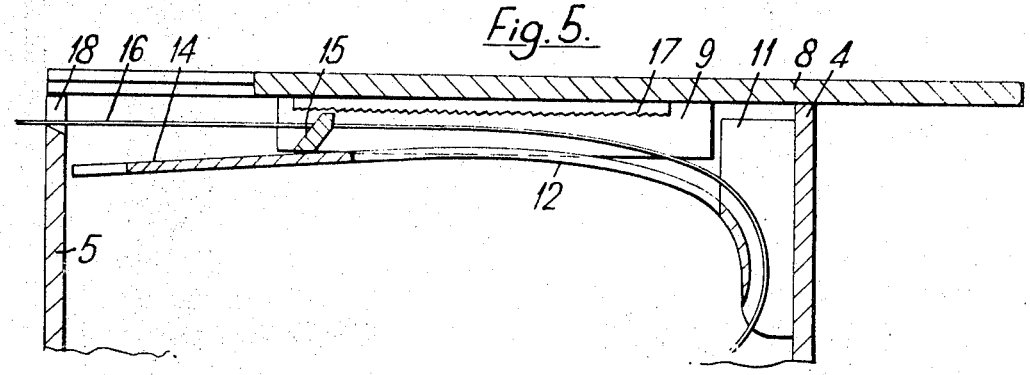
Figure 6:
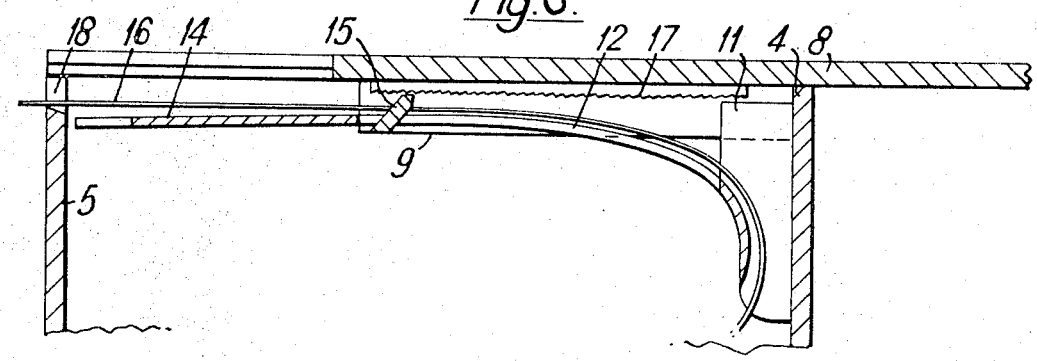
Figure 7:
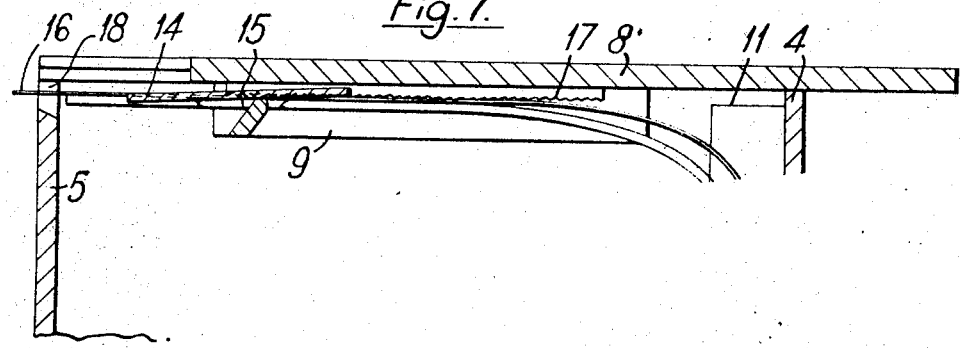

To dispense a length of carrier tape from the roll 16, the housing 1 is gripped by hand and the thumb of the same hand is applied to the top of the cover 8. At this time the cover 8 is slid fully towards the left in the closed position shown in FIG. 4 of the drawings. By movement of the thumb, the cover 8 is then moved towards the right passing through the position shown in FIG. 5 of the drawings. As this movement is performed, the cams 15 come into engagement with the platforms 14 and by riding over these platforms force the free end 13 of the spring 12 downwards as shown in FIG. 5. The movement of the cover 8 towards the right in this way is limited by the flanges 9 coming into engagement with the end wall 4 as shown in FIG. 6 of the drawings. When the cover 8 reaches this position, the cams 15 have moved beyond the ends of the platforms 14 so that the spring 12 is once again freed and it springs upwards into the position shown in FIG. 6 which is the same as that shown in FIG. 4. During all of these movements so far, the end of the roll of carrier tape 16 passes freely between the spring 12 and the underside of the serrated plate 17. The tape is not therefore moved. At this stage, the cover 8 is moved back again by the thumb towards the left from the position shown in FIG. 6 towards that shown in FIG. 7. As this movement starts, the cams 15 engage with the ends of the platforms 14 and force the spring 12 upwards until the cams 15 are able to move underneath the platforms 14 as shown in FIG. 7. During the whole of the movement of the cams 15 under the platforms 14, the spring 12 is forced upwards, being bent longitudinally relative to the ribs 11 and also being bent laterally with the platforms 14 bending upwards about portions 19 by which they are fixed to the main body of the spring 12. This upward movement of the platforms 14 stresses the spring 12 and causes it to press the carrier tape 16 firmly against the serrated plate 17. Owning to the serrations on the plate 17, the tape 16 is gripped by the plate and moves towards the left with the cover 8. This causes a length of the tape 16 to be dispensed through the slot 18. While the tape is still gripped between the spring 12 and the serrated plate 17, that is before the cams 15 reach the lefthand ends of the platforms 14, the dispensed length of the tape is torn off against the sharp bottom edge of the slot 18. The cover 8 is then moved by the thumb through the last part of its movement back into the position shown in FIG. 4 in which the housing 1 is closed and the spring 12 is once again freed because the cams 15 move out of engagement with the undersides of the platforms 14. The container and dispenser is then ready for a further operation.

In the modification shown in FIG. 8, the housing 1 is formed exactly as in the example shown in FIGS. 1 to 7 of the drawings but the spring 12, instead of having a smooth top surface is provided with a pair of integrally moulded upwardly projecting rails 20 and the cover 8 instead of having the serrated plate 17 is instead provided with a pair of ribs 21 having serrated bottom edges. In this modification, the housing 1 instead of holding a roll of adhesive tape 16 holds a roll formed from a strip 22 formed from two layers of sheet material with tablets 23 held at intervals between them. The strip 22 passes between the rails 20 and the ribs 21 with the tablets 23 contained in the spaces between them.

The container and dispenser shown in FIG. 8 operates in exactly the same way as the container and dispenser shown in FIGS. 1 to 7 of the drawings, except that only the edge portions of the strip 22 are gripped between the ribs 21 and the rails 20 so that the strip is fed out of the slot 18 by the forward movements of the ribs 21 the serrated edges of which grip the strip 22.

The containers and dispensers described with reference to the drawings can also be modified in other ways for example for feeding a stack of strip-like articles instead of feeding a continuous strip. In this modification the whole stack of articles is pressed upwards by the spring 12 and the articles are fed one at a time by the serrated plate 17 from the top of the stack on reciprocating the cover 8. The stressing of the spring 12 by the cams 15 ensures that the whole stack is pressed upwards against the plate 17 with an adequate force.

In a further modification, for dispensing a strip forming a package for tablets similar to the strip 22 shown in FIG. 8 of the drawings, the spring 12 may be provided with a locking cross member which engages with the top surface of the strip when the spring is in its unstressed position and so prevents the strip from being withdrawn except when the cover 8 is moved. This locking cross member anchors the strip in position while dispensed tablets attached to the strip are torn off. Upon moving the cover 8 forwards to dispense a further length of strip, the spring 12 is pressed upwards so that the locking cross member also moves upwards out of engagement with the strip near the root of the leaf spring.

I claim:

1. In a device comprising a housing moulded out of thermoplastic plastics material, an operating member, means movably mounting said operating member on said housing and a leaf spring in said housing integrally moulded with said housing out of said thermoplastics plastics material, the improvement comprising a part fixed to said operating member and arranged to act on said spring, said part bending said spring to stress it to make said spring operative as said operating member is moved manually on said housing.

2. A device as claimed in claim 1, wherein said means mounting said operating member includes guide means arranged whereby said operating member can make to and fro sliding movement on said housing.

3. A device as claimed in claim 2, wherein said housing comprises a container for strip material and said operating member includes gripping means arranged to grip said strip and feed out a length of said strip from said container upon said operating member being caused manually to make a return movement after manual movement in one direction, said part which acts on said spring being arranged so that on said return movement, said part moves along a face of said spring remote from said operating member and presses said spring towards said member with said strip sandwiched between said spring and said member.

4. A device as claimed in claim 3, wherein said spring includes opposed side edges, and further comprising a second part fixed to said operating member, said part and said second part moving along said opposed side edges of said spring on the face of said spring remote from said operating member on said return movement of said operating member.

References Cited

UNITED STATES PATENTS

| 3,035,345 | 5/1962 | Barnard | 312—39 |
| 3,405,983 | 10/1968 | Rutz | 312—39 |
| 3,408,125 | 10/1968 | Rasmussen | 312—39 |

PATRICK D. LAWSON, Primary Examiner